(12) United States Patent
Murray

(10) Patent No.: US 9,450,755 B2
(45) Date of Patent: Sep. 20, 2016

(54) TRANSPONDER, READER AND METHODS FOR OPERATING THE SAME

(75) Inventor: Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 578 days.

(21) Appl. No.: 13/454,156

(22) Filed: Apr. 24, 2012

(65) Prior Publication Data

US 2012/0288093 A1 Nov. 15, 2012

(30) Foreign Application Priority Data

May 12, 2011 (EP) .................................. 11165908

(51) Int. Cl.
*H04L 1/00* (2006.01)
*H04L 9/30* (2006.01)

(52) U.S. Cl.
CPC ....... *H04L 9/3066* (2013.01); *H04L 2209/805* (2013.01)

(58) Field of Classification Search
CPC ....... H04L 63/0869; H04L 9/32; H04L 9/06; H04L 9/00; H04L 63/0428; H04L 9/08; G06F 7/725
See application file for complete search history.

(56) References Cited

U.S. PATENT DOCUMENTS

| | | | |
|---|---|---|---|
| 6,483,135 B1 | 11/2002 | Mizuta et al. | |
| 7,200,225 B1 * | 4/2007 | Schroeppel | G06F 7/725 380/277 |
| 7,774,160 B2 * | 8/2010 | Braun | G06F 7/725 380/28 |
| 7,811,872 B2 | 10/2010 | Hoshi et al. | |
| 7,863,648 B2 | 1/2011 | Miyamoto et al. | |
| 2001/0014153 A1 | 8/2001 | Johnson | |
| 2004/0262685 A1 | 12/2004 | Zingg | |
| 2004/0267855 A1 * | 12/2004 | Shantz | G06F 7/5324 708/523 |
| 2009/0292921 A1 * | 11/2009 | Braun | G06F 7/725 713/169 |

FOREIGN PATENT DOCUMENTS

| | | |
|---|---|---|
| CN | 101308796 A | 11/2008 |
| CN | 101754199 A | 6/2010 |
| CN | 101976686 A | 2/2011 |

OTHER PUBLICATIONS

Braun, Michael, et al.; "Using Elliptic Curces on RFID Tags"; IJCSNS Int'l. J. of Comp. Science and Network Security, vol. 8, No. 2 (Feb. 20, 2008).
Miller, Victor; "Use of Elliptic Curves in Cryptography"; Crypto 85; Springer-Verlag; 12 pages.
Seroussi, Gadiel; "Compact Representation of Elliptic Curve Points over $F_2$"; Hewlett Packard Research Report HPL98-94; 6 pages (Sep. 1998).
King, Brian; "A Point Compression Method for Elliptic Curves Defined Over GF($2^n$)"; Public Key Cryptography A PKC 2004; 14 pages (Feb. 2004).
Hein, Daniel, et al.; "ECC is Ready for RFID—A Proof in Silicon"; Selected Areas in Cryptography; Springer Berlin Heidelberg, Berlin, Heidelbert; 14 pages (Aug. 14, 2008).
European Search Report, 11165908.2, Oct. 11, 2011.

* cited by examiner

*Primary Examiner* — Shewaye Gelagay
*Assistant Examiner* — Carlton Johnson

(57) ABSTRACT

It is described a method for operating a transponder (203), the method comprising: receiving, by the transponder, in particular wirelessly, transmitted reader data (205) representing x and sqrt[b]/x, wherein x is an element of a binary Galois field and b is a scalar; processing, by the transponder, the reader data (205) to determine, whether x is a first coordinate of a point on an elliptic curve defined by the elliptic curve equation $y^2+xy=x^3+ax^2+b$, wherein the elliptic curve is defined over the Galois field such that x and y are elements of the Galois field, wherein y is a second coordinate of the point on the elliptic curve. Further a transponder, a method for operating a reader and a reader are described.

14 Claims, 1 Drawing Sheet

TRANSPONDER, READER AND METHODS FOR OPERATING THE SAME

CROSS-REFERNCE TO RELATED APPLICATIONS

This application claims the priority under 35 U.S.C. §119 of European patent application no. 11165908.2, filed on May 12, 2011, the contents of which are incorporated by reference herein.

FIELD OF THE INVENTION

The present invention relates to a method for operating a transponder, to a transponder, to a method for operating a reader and to a reader, wherein in particular the transponder and the reader are adapted for wirelessly transmitting or communicating messages. In particular, the present invention relates to a method for operating a transponder, to a transponder, to a method for operating a reader, and to a reader, wherein elliptic curve cryptography is used, in particular for authentication and/or key agreement.

BACKGROUND OF THE INVENTION

Elliptic curve cryptography is an approach to public key cryptography based on the algebraic structure of elliptic curves over a finite field, also referred to as Galois field. According to an elliptic curve based protocol it is assumed that finding the discrete logarithm of a random elliptic curve element with respect to a publicly known base point (a point on the elliptic curve) is unfeasible. Thereby, the size of the elliptic curve may determine the difficulty of the problem. An elliptic curve is a plane curve, which consists of points (x,y) satisfying the elliptic curve equation along with a distinguished point at infinity. This set of points on the curve and the point at infinity form together with the group operation (elliptic curve addition operation) an Abelian group with the point at infinity as identity element.

Herein, the elliptic curve is defined over a finite field such that the number of elements x over which the elliptic curve is defined, is finite. For the points on the elliptic curve given by the two components x and y, wherein x and y satisfy the elliptic curve equation, an elliptic curve addition operation is defined. Multiple application of the elliptic curve addition operation may define an elliptic curve multiplication operation, wherein the multiplication of a point is an integer multiplication of that point.

The publication "Use of Elliptic Curves in Cryptography", Victor Miller, Crypto '85 discusses the use of elliptic curves in cryptography, wherein a key exchange protocol is proposed, which appears to be immune from a attacks of the style of Western, Miller and Adleman.

The publication "Using Elliptic Curves on RFID Tags", by Braun, Hess, Meyer, International Journal of Computer Science and Network Security, Vol. 8, No. 2, February 2008 discloses a concept for the realization of asymmetric cryptographic techniques in light-weight cryptographic devices and describes an implementation based on elliptic curve cryptography, which can be used for authentication in mass applications of RFID-tags.

OBJECT AND SUMMARY OF THE INVENTION

It is an object of the present invention to provide devices and methods, which enable cryptographic protocols, in particular for authentication purposes, to be less liable to unauthorized attack. In particular, it is an object of the present invention to provide devices and methods improving security during an authentication process or data exchange process. In particular, it is an object of the present invention to provide devices and methods for secure authentication, while delimiting the computational capabilities of the involved devices, in particular of the involved transponder, and in particular RFID tag.

The problem is solved by the subject-matter of the independent claims. Exemplary embodiments are defined in the dependent claims.

According to an embodiment of the present invention it is provided a method for operating a transponder, the method comprising: receiving, by the transponder, in particular wirelessly, transmitted reader data representing x and sqrt [b]/x, wherein x is an element of a binary Galois field and b is a constant value; processing, by the transponder, the reader data to determine, whether x is a first coordinate of a point on an elliptic curve defined by the elliptic curve equation $y^2+xy=x^3+ax^2+b$, wherein the elliptic curve is defined over the Galois field such that x and y are elements of the Galois field, wherein y is a second coordinate of the point on the elliptic curve.

In particular an addition operation and a multiplication operation as defined in the Galois field is to be applied in the elliptic curve equation. Embodiments use Elliptic curve cryptography for authentication and key agreement. The basic data element associated with an elliptic curve is a "point" i.e. a pair of values (x,y) such that these values satisfy the above given curve equation (basically, a mathematical relationship between x and y which defines which points lie on an elliptic curve). The mathematics of certain protocols permit elliptic curve computations to be performed using only the x-coordinates of points on a curve (i.e. omitting the computations which involve the y-coordinate) which may result in protocols which require less computation. This property is in particular associated with Diffie-Hellman key exchanges.

For a given elliptic curve, every value in the underlying finite field is either an x-coordinate of a point on the curve, or of a point on a "sister" curve, the so-called twisted curve. If an elliptic curve computation is performed on the twisted curve (often referred to simply as "the twist") rather than on the intended curve, it is possible that a private key used in the calculation can be easily computed from the input and the output of the calculation. Because of this possibility, a computing device, such as a transponder, checks before the computation that the input lies on the intended curve and not on the twist. Although this is easily achieved when both x and y co-ordinates are available (simply by checking that the co-ordinates satisfy the curve equation), it is potentially a very complex process when only the x-coordinate is supplied by the protocol in use.

Therefore, for constrained devices, a simple method of checking that x-coordinates lie on an intended curve and not on its twist is provided according to an embodiment of the present invention; in particular, this operation operates in the absence of information about the y-coordinate. Thereby the method is specific to curves constructed over binary fields, which are especially suited to constrained devices due to the simpler form of arithmetic in binary fields (compared to prime fields).

The conventional process of calculating whether a given x-coordinate lies on a curve constructed over a binary field requires, among other things, the computation of a so-called "field inverse"; the inverse of a field element x is the value x' such that x*x'=1. Computing such an inverse would require a constrained device to implement a complex algorithm, with an adverse effect on its software and/or hardware complexity. Embodiments of the present invention provide a simplified method of verifying that an x-coordinate lies on a specific curve, and furthermore is within the exact set of points intended for use for the elliptic curve operations.

A transponder (short term for transmitter-responder) may have the capability to receive and transmit a signal upon proper electronic interrogation, in particular by a wireless electromagnetic signal, such as a radio-frequency (RF)-signal. Alternatively, a transponder may use optical fiber communications to receive or transmit a signal. The transponder may be an active transponder having its own energy supply or the transponder may be an inactive or passive transponder having no own energy supply. Nevertheless, even the passive transponder may transmit a signal by influencing an electromagnetic field generated by a reader device to modify the electromagnetic field. The modification of the electromagnetic field may be detectable by the reader device, in order to extract the message or signal the transponder intended to transmit. In particular, the transponder may be a radio-frequency identification tag (RFID-tag), which uses a communication technology using radio waves (electromagnetic waves in the radio frequency band) to exchange data between a reader and the RFID-tag. In particular, the RFID-tag may be attached to an object for the purpose of identification and tracking the object. In particular, the RFID-tag may carry a unique identification number uniquely identifying the RFID-tag and thus the attached object. An RFID-tag may be read from several meters away using a reader device. In particular, a RFID-tag may contain an integrated circuit for storing and processing information, modulating and demodulating a radio-frequency signal and an antenna for receiving and transmitting the signal.

The reader data may have been transmitted by a reader or a reader device having higher computational capabilities and processing capabilities than the transponder. In particular, the reader data may have been transmitted using a RF-signal and may have been received by the transponder using an antenna and afterwards using demodulation techniques for demodulating the received reader data. The reader data represent x and sqrt[b]/x in any order in any possible coding scheme, which is suitable for deriving x as well as sqrt[b]/x therefrom, wherein sqrt[b] denotes the square root of the constant b. In particular the reader data represent may represent (x, sqrt[b]/x). x may e.g. be derived as a first component (or x-component) of a point G on the elliptic curve multiplied by a random number r, i.e. $x=(rG)_x$.

x may for example be encoded as a binary vector having a large number of components, such as 163 components. Thereby, x is an element of a binary Galois field (or binary finite field), wherein the binary Galois field is a finite field containing a finite number of elements, in this case $2^{163}$ elements. In general, the binary Galois field has a number of elements, which may be written as $2^n$, wherein 2 is also called the characteristic of the field and n is a positive integer such as 163 for example. b is a constant value which is defined within the Galois field.

The transponder may process (in particular using a processing circuit, such as an integrated circuit) the reader data (in particular after demodulating or decoding the reader data to extractor retrieve x and sqrt[b]/x) and may run one or more tests to determine whether x is a first coordinate of a point on an elliptic curve defined by the above elliptic curve equation. Further, the transponder may perform one or more consistency tests. A point on the elliptic curve defined by the elliptic equation as given above may be represented as a vector (x,y), wherein x and y are both elements of the Galois field.

Receiving the reader data representing (x, sqrt[b]/x) enables the transponder to determine without extensive computational efforts and computational time to determine, whether x is a component of a point on the elliptic curve. Only, when it is determined that x is a first coordinate of a point on the elliptic curve, the transponder may transmit response data, also called transponder data, which may have been derived from the reader data and a private key of the transponder and a public key of the transponder. Thereby, it may be avoided that the transponder transmits such data also in the case, where x is not a first coordinate of a point on the elliptic curve but a point on the so-called twisted curve. If x is a first coordinate on the twisted curve, a potential attacker may receive and process the transponder data, in order to extract the private key of the transponder in a much more simple manner than in the case, where x is in fact a first coordinate of a point on the elliptic curve. Thereby, it may be avoided that an unauthorized attacker may get access or knowledge of the private key of the transponder. Thereby, an authentication of a transponder and in general a communication between a reader device and a transponder may be improved, in particular regarding data security and authentication or authorization safety.

In particular, an improved method of checking that a value within a Galois field of characteristic 2 (i.e. an element of a so-called "binary field) is the x-coordinate of a point on a specified elliptic curve is provided. This process is referred to as "point validation. Such a function may be required in order to ensure that certain cryptographic protocols are not subject to attack, by applying inputs to devices and systems which are invalid points.

In particular, a x-coordinate supplied to a transponder is accompanied by an additional check value which allows a simpler validation algorithm than the prior art. This is especially valuable in situations in which the validation must be performed within a device which has highly constrained computation capabilities, such as a transponder, especially where the protocol is conducted with a more capable computing device. In particular, applying embodiments of the present invention may simplify the implementation of the constrained device, such as a transponder.

According to an embodiment of the present invention, the processing the reader data by the transponder comprises using a Trace operation, wherein the Trace operation maps each element in the Galois field either to the value 0 or to 1, wherein the Trace operation is the linear operation. Since each element of the Galois field can be represented as a summation in the field of basis elements, the Trace of an element can then in turn be computed as the sum of the pre-computed Traces of each individual basis element. When the Galois field element whose Trace is to be computed is represented as the aforementioned binary vector, then its Trace can be computed by logically AND-ing its binary representation with a corresponding binary vector containing the precomputed Traces of each basis element, and thereafter computing the modulo-2 summation (or parity) of the result of AND-ing these two vectors.

Performing the Trace operation does need extensive computational capabilities of the transponder and can thus be performed by the (light-weight) transponder in a reasonable time. Thereby, the determination, whether x is a first coordinate of a point on the elliptic curve by the above elliptic curve equation may be simplified. Thereby, an authentication check performed by a reader device to the check the authentication of the transponder may be performed in a more secured way. In particular, it may be more difficult for a potential attacker to get knowledge of a private key of the transponder.

According to an embodiment of the present invention, the processing by the transponder further determines, whether x is a first coordinate of a point in a cyclic subgroup of the points on the elliptic curve, wherein the point in the cyclic subgroup can be represented by the result of an elliptic curve addition operation of two points on the elliptic curve. The cyclic subgroup of the points on the elliptic curve is the odd order subgroup of the elliptic curve. Ensuring or checking, whether x is a first coordinate of the odd order subgroup of the elliptic curve points may even further improve the security of the private key of the transponder, when the transponder responds to the received reader data, since a potential attacker catching the response by the transponder may not be able (or may have more difficulties) to derive the private key of the transponder, when the transponder responds to the reader data, in which x is a first coordinate of a point contained in the odd order subgroup of the elliptic curve points.

According to an embodiment of the present invention, the processing involves checking whether Trace[x]==Trace[a] and whether Trace[sqrt[b]/x]==0. Performing the above tests will enable to determine whether x is the first coordinate of a point in the odd order subgroup of the elliptic curve points. Thereby, the security of the operation may be improved.

According to an embodiment of the present invention, the method further comprises storing, by the transponder, (a representation of) sqrt[b] as a first pre-stored value in the transponder (in particular in a storage of the transponder) prior to receiving the reader data. When the first pre-stored value (i.e. sqrt[b]) is stored in the transponder, the processing efforts and/or processing time used by the transponder may be reduced, thus accelerating the method. Further, the transponder may be equipped with less computational equipment or capability than required according to the prior art.

According to an embodiment of the present invention, the method further comprises performing, by the transponder, a multiplication operation of the Galois field elements x and sqrt[b]/x according to the multiplication operation defined in the Galois field (which maps two elements of the Galois field to another element of the Galois field) and comparing the result of performing the multiplication operation with the first pre-stored value (i.e. a representation of sqrt[b]). By performing this multiplication operation and performing the comparison it may be checked or determined by the transponder, whether b contained in the received reader data matches the corresponding elliptic curve parameter of the elliptic curve known to the transponder.

In particular, initially, both the reader and the transponder may have knowledge of the elliptic curve equation, thus both may have knowledge of a and b. Thereby, the transponder may check, whether the received reader data are consistent with the elliptic curve equation represented beforehand in a storage of the transponder. Thereby, the method may further be improved, in particular regarding security issues.

According to an embodiment of the presents invention, the method further comprises storing (a representation of) Trace [a] as a second pre-stored value in the transponder prior to receiving the reader data. Storing Trace [a] in the transponder prior to receiving the reader data may reduce the processing time or processing effort by the transponder when comparing Trace [a] to Trace [x]. In particular, a processing time of the transponder may be reduced or the transponder may be equipped with less computational capabilities.

According to an embodiment of the present invention, each element of the Galois field is represented by a bit-vector having n components, wherein n is between 100 and 200, and particular 163. Thus, each element of the Galois field, such as x and y occurring in the elliptic curve equation, may be represented as a vector having between 100 and 200 components, in particular having 163 components, wherein each component is either zero or one.

Thereby, the addition operation in the Galois field may for example be performed by a component based exclusive OR (XOR) operation. Thereby, the computations may be simplified and the method may be accelerated.

According to an embodiment of the present invention, the Trace operation on x is performed by logically AND-ing the binary representation of x with a corresponding binary vector containing the precomputed Traces of each basis element, and thereafter computing the modulo-2 summation (or parity) of the result of AND-ing these two vectors.

Thereby, the method may be simplified or accelerated.

According to an embodiment of the present invention, the processing performed by the transponder is completed after performing two Trace operations and one multiplication operation. In particular, the multiplication operation may involve performing a multiplication of the Galois elements x and sqrt[b]/x and the two Trace operations may involve forming Trace [x] and forming Trace (sqrt[b]/x). Thereby, no high demands are to be required on the processing capabilities of the transponder. Thereby, the transponder may be manufactured in a compact and cost-effective manner.

According to an embodiment of the present invention, the reader data are supplied in an error-protected format based on a composite modulus representation. In such a representation, the values of x and sqrt[b]/x are extended and represented by a larger number of bits than the number (in a case of an example embodiment this being 163) of bits minimally required to represent an element of the Galois field. The bits representing each extended quantity are chosen such the redundant information in the extended x and sqrt[b]/x would result in known redundant information in the product of the extended values. If the computation of this product is manipulated by an attacker, then with high probability the computed product would contain incorrect redundancy and the manipulation would be detected. Thereby, security of the method may further be improved.

According to an embodiment of the present invention, the method for operating the transponder further comprises, if the transponder has determined that x is a first coordinate of a point on the elliptic curve defined by the elliptic curve equation, transmitting, in particular wirelessly, by the transponder, transponder data, wherein the transponder data are based on (in particular depend on) x and on a private key stored in the transponder, wherein the transponder data are in particular further based on a public key stored in the transponder. Thereby, the transponder may respond to the received reader data, in particular for continuing an authentication process. The transponder data, i.e. the response to the received reader data, may be received by a reader device in order to authenticate the transponder. In particular, the reader device may perform one or more checks or comparisons and/or computations before the checks and/or comparisons in order to derive, whether the transponder data have been derived by the transponder based on x and on a private key, which has an expected relationship to the public key of the transponder. Thereby, an authentication of the transponder may be performed, without giving an attacker the opportunity to derive the private key of the transponder from the transponder data. Thereby, an authentication method for authenticating a transponder may be improved.

It should be understood that features (individually or in any combination) disclosed, described, explained or applied to a method for operating a transponder, may also be (individually or in any combination) applied to, used for or provided for a transponder, to a method for operating a reader and to a reader according to an embodiment of the present invention and vice versa.

According to an embodiment, it is provided a transponder, comprising: a reception module adapted to receive, in particular wirelessly, transmitted reader data representing x and sqrt[b]/x, wherein x is an element of a binary Galois field and b is a scalar (sqrt[b]/x denotes the square root of b divided by x, wherein the division is defined for elements of the Galois field); a processing module adapted to process the reader data to determine, whether x is a first coordinate of a point on an elliptic curve defined by the elliptic curve equation $y^2+xy=x^3+ax^2+b$, wherein the elliptic curve is defined over the Galois field such that x and y are elements of the Galois field, wherein y is a second coordinate of the point on the elliptic curve, wherein in particular in the elliptic curve equation an addition operation and a multiplication operation as defined in the Galois field is to be applied.

In particular, the reception module is adapted to receive a RF-signal, i.e. a electromagnetic signal in the radio-frequency band. Further, the reception module may comprise circuitry for decoding or demodulating the received signal in order to extract x and sqrt[b]/x. In particular, the processing module may be programmable and may have access to a data storage device, to a data table or hash table. In particular, the transponder according to an embodiment of the present invention may be manufactured in a smaller or less heavy manner compared to a conventional transponder, while at the same time providing a same degree of security features, in particular regarding security of the private key of the transponder.

According to an embodiment of the present invention, it is provided a method for operating a reader, the method comprising: transmitting, by the reader, in particular wirelessly, reader data representing x and sqrt[b]/x, wherein x is an element of a binary Galois field and b is a constant, wherein the method in particular further comprises: receiving, in particular wirelessly, by the reader, transponder data, wherein the transponder data are based on x and on a private key stored in the transponder. In particular, the reader may be a device, which has much higher computational capabilities than the transponder. In particular, the reader may transmit the reader data for initiating an authentication process for authenticating the transponder. Upon receiving the transponder data (only in the case where x is a component of a point on the elliptic curve defined by the elliptic curve equation), the reader may perform processing steps and comparison or checking steps in order to determine, whether the transponder transmitted the transponder data, which are consistent with a public certificate of a public key of the transponder. Thereby, the reader is enabled to authenticate the transponder, in particular the RFID-tag.

According to an embodiment of the present invention, it is provided a reader, comprising: a transmission module adapted to transmit, in particular wirelessly, reader data representing x and sqrt[b]/x, wherein x is an element of a binary Galois field and b is a constant, wherein the reader in particular further comprises: a reception module adapted to receive, in particular wirelessly, transponder data, wherein the transponder data are based on x and on a private key stored in the transponder.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
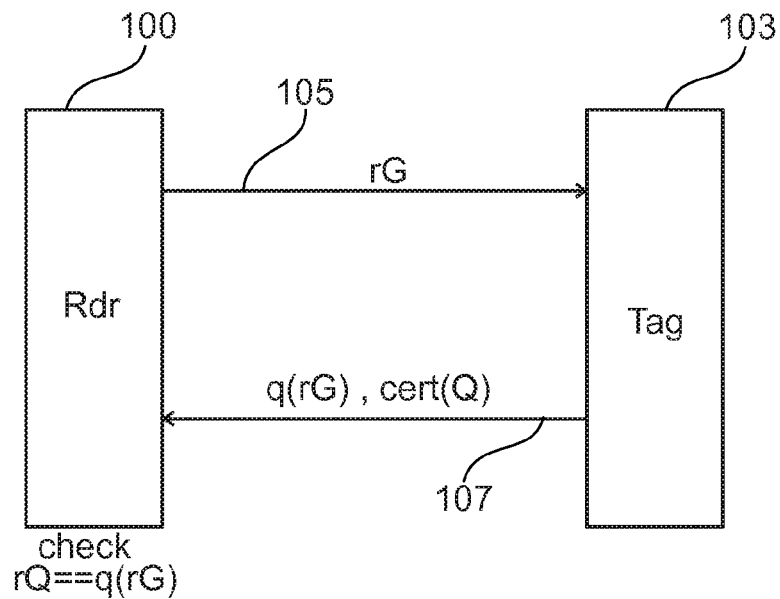
FIG. 1 schematically illustrates a system comprising a reader and a transponder according to embodiments of the present invention performing an authentication process according to an embodiment of a method for operating a transponder and an embodiment of a method for operating a reader.

The illustration in the drawings is schematical. In different drawings, similar or identical elements are provided with similar or identical reference signs.

FIG. 1 illustrates a communicating session of a reader 100 and a transponder 103 for authenticating the transponder 103. The reader 100 wirelessly transmits a message or reader data 105 (in this case rG, wherein G is a point on the elliptic curve and r is a random number), which are received by the transponder 103. The transponder 103 performs some processing and returns a message or reader data 107 (in this case q(rG) and cert(Q), wherein q is a private key of the transponder and Q=qG is a public key of the transponder) wirelessly to the reader 100. Upon receiving the reader data 107, the reader performs some computation and checking procedures to authenticate the transponder 103.

In particular, the RFID tag 103 uses an elliptic curve Diffie-Hellman authentication protocol as shown in FIG. 1. In this protocol, the reader "Rdr" 100 generates a random number r and performs an elliptic curve point multiplication to compute the point rG (where G is the basepoint chosen for the intended elliptic curve). It then sends this result, an elliptic curve point, to the tag 103. The tag 103 possesses a public/private key pair, where the scalar q is the private key, and the point Q=qG is the public key computed on the desired elliptic curve. Additionally, the tag carries certificate cert(Q), which is a signature computed over the public key (and possibly other data associated with the tag), where this signature is generated using the private key of a trusted authority; this signature can be verified using the corresponding public key of the trusted authority. This allows anyone to verify that the public key is that of a genuine tag as assured by the trusted authority; in particular, this certificate would be verified by the reader as part of the authentication protocol.

Upon receipt of the point (rG) at the transponder 103, which can be regarded as a challenge input to the tag 103, the tag multiplies the received point by its private key q, and then delivers the result q(rG) back to the reader 100. Since this computation should be equivalent to r(qG), the reader is able to validate that the tag used (and hence knows) the correct private key value q, by checking that the point q(rG) which it received matches the computation of r(qG)=rQ.

At the most abstract level, this protocol can be thought of as operating on complete points on the desired elliptic curve, defined by an (x,y) co-ordinate pair. However, such a protocol can also operate using only the x-coordinates of the points concerned according to an embodiment of the invention, but additionally sending a further check value, as explained below with reference to FIG. 2. However the protocol is implemented, using either (x,y) coordinates or using only x-coordinates, it is very important for the tag to verify that the point supplied to it really lies on the desired elliptic curve. The reason for this "validity check" is as follows.

Every elliptic curve defined over a finite field has a "sister" curve, the so-called "twisted" curve (also referred to in short as "the twist"); the points on the twisted curve are located at the x-coordinate values in the finite field which do not lie on the original curve. Since there are two points at each x-coordinate on a curve or its "twist", the relationship between the number of points on a curve E and the number on its twist E' is very simple i.e.

$$\#E + \#E' = 2 + 2 * \#GF$$

In other words, the total number of points on the curve and its twist is twice the size of the underlying field, plus 2 (which are the so called "points at infinity" on each curve).

Accordingly, when the number of points on a curve is known, the number on its twist is trivially calculated.

In general, the problem for an attacker who wishes to learn the private key q of a tag is to solve the so-called elliptic curve discrete logarithm problem (EC-DLP); given the input point (rG) and the output point q(rG), he wishes to calculate the value q. In general, this problem has a complexity which is determined by the square root of the largest factor of #E, when the computation of q(rG) is performed on curve E.

Normally, the desired curve E is chosen such that #E is either prime or has a very large prime factor; however, this choice can lead to circumstances in which #E' is "smooth" i.e. contains many small prime factor, such that the square root of its largest prime factor is not very high. In such a case, if an attacker substitutes a point on E' for the originally intended point (rG) computed on E, then the tag will compute q(rG) using the curve E' and the recovery of q by the attacker will be very much simpler.

Therefore, the reader 100 additionally sends a further check value to enable the transponder 103 to determine whether the received point rG is a point on the elliptic curve, as will be explained below.

To prevent such an attack, the tag must verify that the point supplied to it in the protocol actually lies on the intended curve E. Furthermore, when curves are constructed over binary fields, it is invariably the case that the number of points on the curve #E is an even number, usually chosen to be two times a large prime n (a so-called "co-factor=2 curve"); in these circumstances, the elliptic curve protocol is usually conducted on the points which form an order n subgroup, so the points of order 2 and 2n should also be excluded by the validation check. The order n subgroup contains all points which, when multiplied by the scalar n, produce the point at infinity. As noted above, when curves are defined over binary fields, the normal practice is to chose curve parameters such that n is prime, and hence a cyclic subgroup of points on the curve.

To perform this validation check, embodiments of the invention use the properties of a mathematical function known as Trace( ). Trace( ) maps each element in the Galois field to the value 0 or 1. It is well known that a quadratic equation of the form $y^2 + y = \alpha$ is soluble over a binary Galois field if Trace($\alpha$)=0; hence, for the normal curve equation $$y^2 + xy = x^3 + ax^2 + b$$

a solution (x,y) can be shown to exist when, for x≠0

$$(y/x)^2 + (y/x) = x + a + (b/x^2)$$

and accordingly when Trace(x+a+(b/$x^2$))=0.

Since Trace is an additive function (i.e. Trace(v+w)= Trace(v)+Trace(w)) and preserves squaring i.e. Trace($v^2$)= Trace2(v), then the equation has a solution when $$\text{Trace}(x) + \text{Trace}(a) + \text{Trace}(\sqrt{b}/x) = 0$$

Since "a" is a curve equation constant, its Trace( ) can be pre-computed.

Furthermore, since it is known that one can establish whether an x-coordinate is that of points lying in the odd order subgroup of an elliptic curve over GF(2 n) by checking whether Trace(x)=Trace(a), two Trace( ) computations enable us to validate an input point fully, namely we check that Trace(x)==Trace(a) and that Trace($\sqrt{b}$/x)==0

Computing Trace( ) is a relatively simple operation. The bit-vector whose Trace( ) is to be computed can be regarded as a summation of individual powers of the polynomial t whose coefficients are 1. Then, using the additive property of Trace( ) we compute the Trace( ) of an arbitrary element in GF($2^n$) by AND-ing it with the pre-computed values of Trace(t) and then computing the modulo 2 sum (i.e. parity) of all bits in the result. Such a computation can be easily performed by logic circuits or operations defined in the software of a computer or microcontroller.

Figure 2:
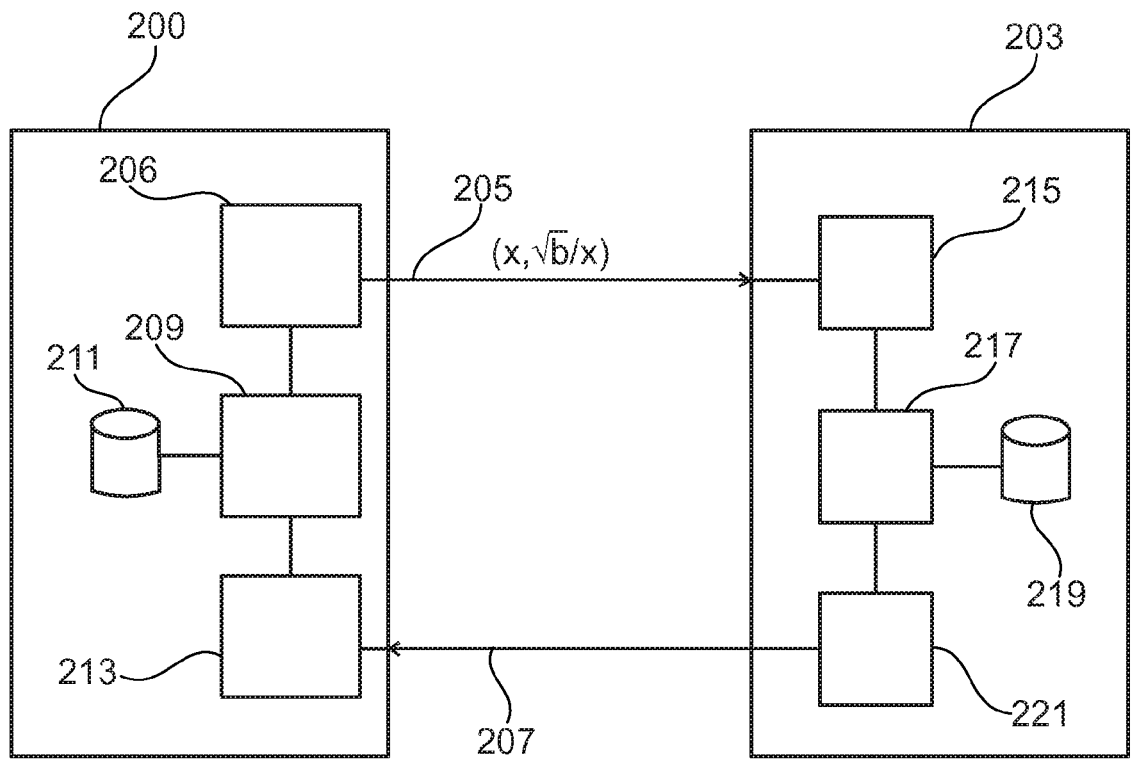
FIG. 2 schematically illustrates another system comprising a reader and a transponder according to embodiments of the present invention performing an authentication process according an embodiment of a method or operating a transponder and an embodiment of operating a reader according to the present invention.

FIG. 2 schematically illustrates a system comprising a reader 200 and a transponder 203, wherein an authentication process is performed involving an operation of a transponder and an operation of the reader according to embodiments of the present invention. The reader 200 comprises a transmission module 206 for encoding, modulating and wirelessly transmitting a message or reader data 205 to the transponder 203. Further, the reader 200 comprises a processing module 209 for processing data, wherein the processing module 209 has access to a data storage device 211. In the data storage device 211 parameters of the above elliptic curve equation for defining an elliptic curve may be stored. In particular, in the storage device 211 the scalars a and b may be stored as well as a predetermined point G on the elliptic curve. Further, the processing module 209 may be adapted to generate a random number r being a scalar. The processing module 209 of the reader 200 is communicatively connected to a reception module 213, which is adapted for receiving, in particular via an antenna, transponder data 207 sent by the reader 203 and for decoding and/or demodulating the transponder data 207. Extracted information from the transponder data 207 are supplied from the reception module 213 to the processing module 209.

The transponder 203 (in the illustrated embodiment represented by a RFID-tag) comprises a reception module 215 for receiving, in particular via an antenna, the reader data 205 transmitted by the reader 200. The reception module 215 demodulates and/or decodes the reader data 205 and supplies the extracted information, such as (x and sqrt(b)/x), to a processing module 217, which is adapted to perform a Trace operation and an elliptic curve multiplication or elliptic curve addition operation. The processing module 217 has access to a storage device 219. In particular, in the storage device 219 the parameters of the elliptic curve equation, in particular the parameters a and b, are stored and also the predetermined point G on the elliptic curve may be stored. Further, the storage device 219 may comprise a private key q of the transponder 203 and also a public key Q of the transponder 203. In particular, the public key Q of the transponder 203 may be derived or pre-computed to be qG, wherein G is the predetermined point on the elliptic curve known to both the reader 200 and the transponder 203. Further, the transponder may have access to a certificate ("cert") ensuring the reliability of the public key Q, wherein the certificate may have been issued by an authorized certification authority.

Based on the received reader data 205, from which (x, sqr[b]/x) is derivable by the transponder, the processing module 217 of the transponder 203 derives response data or transponder data 207, which are encoded and/or modulated by the transmission module 221 comprised in the transponder and are then sent as the transponder data 207 to the reader 200.

The content of the transponder data 207 may vary from embodiment to embodiment, but the transponder data are based on the value x received from the reader 200 in the reader data 205 and the transponder data 207 are also based on the private key q of the transponder 203. Further, the transponder data 207 may be based on the public key Q of the transponder 203. In particular, the transponder data 207 may be similar to the transponder data 107 illustrated in FIG. 1.

After receiving the reader data 205, from which (x, sqr[b]/x) can be derived, the processing module 217 of the transponder 203 calculates Trace [x] and compares the result with Trace [a], which is pre-computed and stored in the storage device 219. Further, the processing module 217 of the transponder 203 calculates Trace (sqrt[b]/x) and checks whether the result is zero. Further, the processing module 217 performs a Galois field multiplication operation by multiplying x and sqrt[b]/x in order to derive sqr[b], as received from the reader 200. Further, this value of sqr[b] is compared to the pre-stored value of sqr[b] stored in the storage device 219. If the value for sqr[b] matches the value for (sqr[b]) stored in the storage device 219, and if the computed value for Trace [x] matches the pre-computed and stored value for Trace [a] and if the computed value for Trace (sqr[b]/x) equals zero, then the transponder 203 has verified that both the reader 200 and the transponder 203 refer to the same elliptic curve equation (because the parameters are identical) and that the value x is a first coordinate of a point on the elliptic curve and that further the point on the elliptic curve is an element of the odd order subgroup of the points on the elliptic curve. Therefore, it is safe to respond to the reader using the transponder data 207 without having the risk that the transponder data 207 are analyzed by a potential attacker, in order to extract the private key q of the transponder 203.

According to an embodiment of the invention a special protocol construction is provided which is designed to minimize the computation required on the tag in order to achieve this Trace( ) based checking. In this protocol, the reader 200 sends to the tag 203 a pair of values; however, instead of the conventional (x,y) co-ordinates of a point, or a single x co-ordinate, it sends the pair of data values (x, √b/x). This transfers the responsibility for computing the modular inversion to the reader, where usually far more computational power is available.

The value √b is constant which can be pre-computed, being derived from the curve parameter b; in fact, it is a natural value to store within the tag 203 in any case, since in order to perform the usual elliptic curve scalar multiplication operations, this value is typically used within each computation step; accordingly, storing this value within the tag presents no overhead. It should be noted that this principle works for any cofactor-2 elliptic curve defined over a binary field, since √b can always be computed (every value in a binary field has a square root of this form).

When using this protocol, then, the tag only needs to perform a single multiplication, where it computes the product within the field of the two received values x and √b/x, and verifies that the result is equal to √b; this checks that the two values supplied form a consistent pair. It can then check that Trace(x)=Trace(a) and that Trace(√b/x)=0 directly using the two input values (again, Trace(a) is pre-computable).

This is a simpler and more efficient checking method than that which would be required if (x,y) was supplied, whereby the tag would have to verify the curve equation was satisfied by the input co-ordinates. As a minimum, this requires computation of $$y(x+y)=(x+a)x^2+b$$

which can be seen to need 2 multiplications and a squaring operation on the tag, and then an additional Trace( ) computation to check that Trace(x)=Trace(a) check to achieve the full validation or odd order.

In contrast, the protocol of the invention requires only a single multiplication and two Trace( ) computations; the inventor believes that no simpler, secure point validation method exists for this type of elliptic curve.

Note that the values (x, √b/x) can be supplied to the tag in an error protected format based a composite modulus representation; this can then serve to protect the multiplication used within the tag to check consistency of the data pair against fault attacks.

The invention can be used as the basis of a protocol for RFID tags using asymmetric authentication based on elliptic curves.

For other cryptographic protocols (e.g. key exchange, other authentication protocols) using elliptic curves, the invention can be applied as a mechanism to simplify point validation within constrained devices wherever the protocol is conducted between devices with differing amounts of computing resource. Such applications might be found in future NFC applications, automatic fare collection or electronic-ID devices.

The invention claimed is:

1. Method for operating a transponder, the method comprising:

receiving transmitted reader data by the transponder, the reader data comprising a representation of x a representation of sqrt[b]/x, redundant information associated with x, and redundant information associated with sqrt[b]/x, wherein x is an element of a binary Galois field and b is a constant;

determining, by the transponder, whether x is a first coordinate of a point on an elliptic curve defined by the elliptic curve equation $y^2+xy=x^3+ax^2+b$ by determining (if Trace(x)=Trace(a) and if Trace (√b/x)=0;

calculating a product from the redundant information associated with x and the redundant information associated with sqrt[b]/x; and
determining if redundant information in the calculated product is known by the transponder;
wherein the elliptic curve is defined over the Galois field such that x and y are elements of the Galois field,
wherein y is a second coordinate of the point on the elliptic curve.

2. Method according to claim 1, wherein the determining, by the transponder, further comprises using a Trace operation, the Trace operation mapping each element in the Galois field either to 0 or to 1, the Trace operation being a linear operation.

3. Method according to claim 1, wherein determining by the transponder further determines whether x is a first coordinate of a point in a cyclic subset of the points on the elliptic curve, wherein the point in the cyclic subset can be represented by the result of an elliptic curve addition operation of two points on the elliptic curve.

4. Method according to claim 1, further comprising storing sqrt[b] as a first pre-stored value in the transponder prior to receiving the reader data.

5. Method according to claim 1, further comprising, by the transponder, performing a multiplication operation of the Galois elements x and sqrt[b]/x according to the multiplication operation defined in the Galois field and comparing the result of performing the multiplication operation with the first pre-stored value.

6. Method according to claim 1, further comprising storing Trace[a] as a second pre-stored value in the transponder prior to receiving the reader data.

7. Method according to claim 1, wherein each element of the Galois field is represented by a bit-vector having n components, wherein n is between 100 and 550.

8. Method according to claim 1, wherein the Trace operation on x is performed by logically AND-ing the binary representation of x with a corresponding binary vector containing the pre-computed Traces of each basis element, and thereafter computing the modulo-2 summation of the result of AND-ing these two vector fields.

9. Method according to claim 1, wherein the processing is completed after performing two Trace operations and one multiplication operation.

10. Method according to claim 1, wherein the reader data are supplied in an error protected format based on a composite modulus representation.

11. Method according to claim 1, further comprising,
if it is determined that x is a first coordinate of a point on the elliptic curve defined by the elliptic curve equation:
transmitting, by the transponder, transponder data,
wherein the transponder data are based on x and on a private key stored in the transponder,
wherein the transponder data are further based on a public key stored in the transponder.

12. The method of claim 1, the method further comprising:
transmitting, by the reader, reader data representing x and sqrt[b]/x, wherein x is an element of a binary Galois field and b is a constant,
wherein the method further comprises:
receiving, by the reader, transponder data,
wherein the transponder data are based on x and on a private key stored in the transponder.

13. Transponder, comprising:
a reception module adapted to receive, transmitted reader data, the reader data representing x, sqrt[b]/x, redundant information associated with x, and redundant information associated with sqrt[b]/x, wherein x is an element of a binary Galois field and b is a constant;
a processing module adapted to determine, whether x is a first coordinate of a point on an elliptic curve defined by the elliptic curve equation $y^2+xy=x^3+ax^2+b$ by determining (if Trace(x)==Trace(a) and if Trace($\sqrt{b}$/x)==0;
calculating a product from the redundant information associated with x and the redundant information associated with sqrt[b]/x; and
determining if redundant information in the calculated product is known by the transponder;
wherein the elliptic curve is defined over the Galois field such that x and y are elements of the Galois field,
wherein y is a second coordinate of the point on the elliptic curve.

14. The transponder of claim 13 further configured for use with a reader, the reader comprising:
a transmission module adapted to transmit reader data representing x and sqrt[b]/x, wherein x is an element of a binary Galois field and b is a constant,
wherein the reader further comprises:
a reception module adapted to receive transponder data,
wherein the transponder data are based on x and on a private key stored in the transponder.

* * * * *